(12) United States Patent
Hamaya (10) Patent No.: US 11,487,278 B2
(45) Date of Patent: Nov. 1, 2022

(54) PLANT CONTROL AND MONITORING SYSTEM

(71) Applicant: MITSUBISHI ELECTRIC CORPORATION, Tokyo (JP)

(72) Inventor: Yoichiro Hamaya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 928 days.

(21) Appl. No.: 16/089,926

(22) PCT Filed: Apr. 15, 2016

(86) PCT No.: PCT/JP2016/062107
§ 371 (c)(1),
(2) Date: Sep. 28, 2018

(87) PCT Pub. No.: WO2017/179189
PCT Pub. Date: Oct. 19, 2017

(65) Prior Publication Data
US 2019/0113911 A1 Apr. 18, 2019

(51) Int. Cl.
*G05B 23/02* (2006.01)
*G05B 19/042* (2006.01)
*G06Q 10/00* (2012.01)

(52) U.S. Cl.
CPC ..... *G05B 23/0283* (2013.01); *G05B 19/0423* (2013.01); *G05B 23/0213* (2013.01); *G06Q 10/20* (2013.01)

(58) Field of Classification Search
CPC ............ G05B 23/0283; G05B 23/0213; G05B 19/0423; G06Q 10/20
See application file for complete search history.

(56) References Cited

U.S. PATENT DOCUMENTS 9,460,573 B1 * 10/2016 Cordes ...................... G07C 9/21
2011/0221592 A1 * 9/2011 Maziak ............... G06F 11/0748
340/540

(Continued)

FOREIGN PATENT DOCUMENTS

CN 101662785 A * 3/2010 ............ H04W 88/08
CN 101924787 A * 12/2010 ............ G07F 9/026

(Continued)

OTHER PUBLICATIONS

Zhu, Xiuna, "A Remote Wireless System for water quality online Monitoring in Intensive Fish Culture", Apr. 2010, Computers and Electronics in Agriculture, vol. 71, Supplement 1, pp. S3-S9. (Year: 2010).*

(Continued)

*Primary Examiner* — Tan D Nguyen
(74) *Attorney, Agent, or Firm* — Buchanan Ingersoll & Rooney PC (57) ABSTRACT

A plant control and monitoring device includes a communication card having a first wireless communication chip on which a first unique ID is recorded, a CPU card having a second wireless communication chip on which a second unique ID is recorded, an input card having a third wireless communication chip on which a third unique ID is recorded, and a power supply unit having a fourth wireless communication chip on which a fourth unique ID is recorded. The first wireless communication chip reads out a unique ID from the second wireless communication chip or the fourth wireless communication chip, and transmits a read out unique ID to a maintenance tool through a control network. In a plant control and monitoring system, when the maintenance tool receives a unique ID transmitted through the control network, the maintenance tool collates the received unique ID with an ID database.

8 Claims, 6 Drawing Sheets

(56) References Cited

U.S. PATENT DOCUMENTS

| | | | | |
|---|---|---|---|---|
| 2013/0166608 A1* | 6/2013 | Schlitt | ............... | G06F 16/22 |
| | | | | 707/803 |
| 2015/0347600 A1* | 12/2015 | Tabe | ............... | G06Q 50/01 |
| | | | | 707/710 |
| 2016/0142868 A1* | 5/2016 | Kulkarni | ............ | H04W 4/80 |
| | | | | 455/456.5 |
| 2017/0039517 A1* | 2/2017 | Amann | ............ | H04W 4/023 |

FOREIGN PATENT DOCUMENTS

| | | | | | |
|---|---|---|---|---|---|
| CN | 102106137 A | * | 6/2011 | ............... | G06F 3/14 |
| CN | 103380057 A | * | 10/2013 | ............. | G01N 23/00 |
| JP | 2007317866 A | | 12/2007 | | |
| JP | 2010009397 A | | 1/2010 | | |
| JP | 2011203972 A | | 10/2011 | | |
| JP | 2015157700 A | | 9/2015 | | |
| WO | WO-2017179189 A1 | * | 10/2017 | ......... | G05B 19/0423 |

OTHER PUBLICATIONS

Kuang-Yow Lian, "Mobile Monitoring and Embedded Control System for Factory Environment", 2013, Sensors, 13, pp. 17379-17413. (Year: 2013).*

Xiaolin Jia, "RFID Technology and its Applications in Internet of Things (IOT)", 2012, IEEEXPLORE, pp. 1282-1285. (Year: 2012 ).*

International Search Report (PCT/ISA/210) dated Jun. 28, 2016, by the Japan Patent Office as the International Searching Authority for International Application No. PCT/JP2016/062107.

Written Opinion (PCT/ISA/237) dated Jun. 28, 2016, by the Japan Patent Office as the International Searching Authority for International Application No. PCT/JP2016/062107.

\* cited by examiner

PLANT CONTROL AND MONITORING SYSTEM

FIELD OF THE INVENTION

The present invention relates to a plant control and monitoring system, and more particularly, relates to a plant control and monitoring system which conducts management on the identity of component parts by the use of IDs which are unique to the component parts.

BACKGROUND OF THE INVENTION

In a plant control and monitoring system, such as for power generation, chemicals and the like, many plant installations, like a field instrument, a PIO (Process Input Output) device and others, are used, in order to collect process data from the accompanying facilities. A plant control and monitoring device is a device for managing these plant facilities, and consists of the combination of component parts, like a CPU (Central Processing Unit) card, a communication card, an input and output card, a power supply unit, a fan and others. The plant control and monitoring device is computerized for data acquisition, and when the device has a broken component part or the like, replacing the broken component part with a component part of the same model type (a service part) makes it possible for the device to maintain its function.

In the plant control and monitoring device, when an existing part is replaced with a service part, the identity of a component part at the production time may slip out of the memory. In most cases, the management of the identity to these component parts is performed by taking notes at the time of maintenance with the help of human works. In order to promote the efficiency in the record and management of the identity with respect to component parts, a hardware identification system or a hardware identification method which use a wireless tag, a RFID (Radio Frequency Identification) and the like, have been proposed (for example, refer to Patent Documents 1-4).

CITATION LIST

Patent Literature

Patent Document 1: JP 2010-009397, A
Patent Document 2: JP 2007-317866, A
Patent Document 3: JP 2011-203972, A
Patent Document 4: JP 2015-157700, A

SUMMARY OF THE INVENTION

Technical Problem

According to the hardware identification system which employs a wireless tag, a RFID and the like in order to discriminate component parts, a maintenance member goes to a control device at a job spot, and is in charge of reading out the identification information using a maintenance terminal, such as a wireless reader and the like. In such a situation mentioned above, replacement of the component part cannot be grasped in real time from a maintenance tool which is installed in a distant place. Even if a component part is replaced with a service part on which an injustice work is created to spoil the operation of the plant, it is most likely that the replacement cannot be detected.

The present invention is made in order to solve the subject matter in the above mentioned plant control and monitoring system or the hardware identification system. The present invention aims at obtaining a plant control and monitoring system which can get hold of a component part from a maintenance tool on the communication network, to which the plant control and monitoring device is connected, where a component part of the plant control and monitoring device is controlled by an ID which is unique to the component part.

Solution to Problem

A plant control and monitoring system, in connection with the present invention, includes; a maintenance tool, having an ID database which correlates a unique ID with a component part that possess the unique ID, and holds a relation between the unique ID and the component part in memory and a plant control and monitoring device connected with a maintenance tool through a control network, wherein the plant control and monitoring device owns a communication card which possesses a first wireless communication chip on which a first unique ID is recorded, a CPU card which possesses a second wireless communication chip on which a second unique ID is recorded, an input card which possesses a third wireless communication chip on which a third unique ID is recorded, and a power supply unit which possesses a fourth wireless communication chip on which a unique ID is recorded, and wherein the first wireless communication chip that is possessed by the communication card reads out a unique ID from the second wireless communication chip or the fourth wireless communication chip, and transmits the read out unique ID to the maintenance tool through the control network, and when the maintenance tool receives a unique ID which is transmitted through the control network, the maintenance tool collates the received unique ID with the ID database.

Advantageous Effects of Invention

A plant control and monitoring system, in connection with the present invention, includes; a maintenance tool, having an ID database which correlates a unique ID with a component part that possess the unique ID, and holds a relation between the unique ID and the component part in memory and a plant control and monitoring device connected with a maintenance tool through a control network, wherein the plant control and monitoring device owns a communication card which possesses a first wireless communication chip on which a first unique ID is recorded, a CPU card which possesses a second wireless communication chip on which a second unique ID is recorded, an input card which possesses a third wireless communication chip on which a third unique ID is recorded, and a power supply unit which possesses a fourth wireless communication chip on which a unique ID is recorded, and wherein the first wireless communication chip that is possessed by the communication card reads out a unique ID from the second wireless communication chip or the fourth wireless communication chip, and transmits the read out unique ID to the maintenance tool through the control network, and when the maintenance tool receives a unique ID which is transmitted through the control network, the maintenance tool collates the received unique ID with the ID database. Therefore, identification information on the component part of the plant control and monitoring device can be grasped without going to a job spot, unauthorized exchange of component parts will be reported in real time, and improvement in the security can be attained.

DESCRIPTION OF EMBODIMENTS

Hereinafter, a plant control and monitoring system according to the embodiments of the present invention will be described with reference to drawings. Incidentally, the same reference numerals are given to those identical or similar to constitutional portions in respective drawings and the size and/or the scale size of the corresponding respective constitutional portions are respectively independent. For example, when the identical constitutional portions, which are not changed, are shown, the size and/or the scale size of the identical constitutional portions may be different among sectional views in which a part of the configuration is changed. Furthermore, although the configurations of the plant control and monitoring system are further actually provided with a plurality of members, for ease of explanation, only portions necessary for explanation will be described and other portions are omitted.

Embodiment 1

Figure 1:
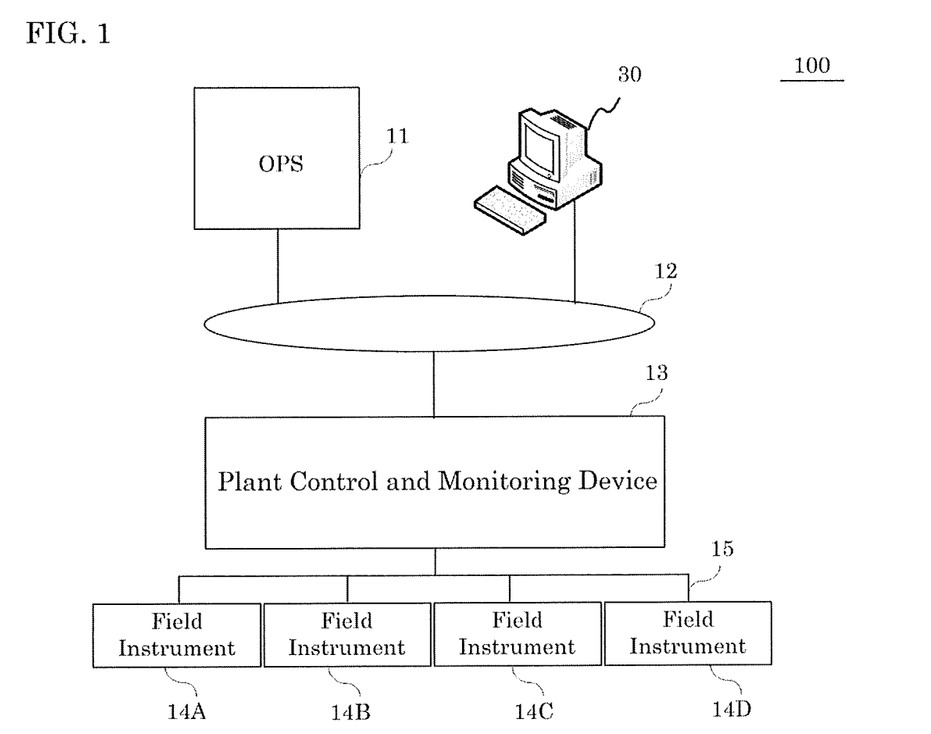
FIG. 1 is a drawing for showing an overall configuration of a plant control and monitoring system, in accordance with the embodiments of the present invention.

FIG. 1 shows a configuration of a plant control and monitoring system, in accordance with the present embodiments. The plant control and monitoring system 100 consists of an operator station 11 (a first operator station), a control network 12, a plant control and monitoring device 13, field instruments 14A-14D, a maintenance tool 30 (a second operator station), and the like. In the plant control and monitoring system 100, three or more operator stations (OPS Operator Station or Operator's Station) are most commonly connected with the plant control and monitoring device 13 through the control network 12 which is of exclusive use. It is much likely that a PIO (Process Input Output) device becomes a substitute for the field instrument 14.

The field instruments 14A-14D are connected to the plant control and monitoring device 13 by a dedicated line 15, and are in charge of transmitting process data, which are produced in an industry use plant, a power generation plant and others, to the plant control and monitoring device 13. The plant control and monitoring device 13 collects the process data (or monitoring data) which are transmitted from the field instruments 14A-14D by way of the dedicated line 15, and is in charge of monitoring the state of plants, such as an industry use plant, a power generation plant and others, based on these collected data. The operator station 11 is capable of transmitting and sending out of the data, not only with the plant control and monitoring device 13, but also with the maintenance tool 30.

The process data which are collected from the field instruments 14A-14D will be transmitted from the plant control and monitoring device 13, by way of the control network 12, to the operator station 11 and the maintenance tool 30. The field instruments 14A-14D are registered, using an input point number, on the memory buffer of the operator station 11. In the operator station 11, input point information (input point numbers and the like), occurrence times of the data, process values, and so on are saved on the memory buffer, and the creation of a trend graph is performed based on these pieces of information.

Figure 2:
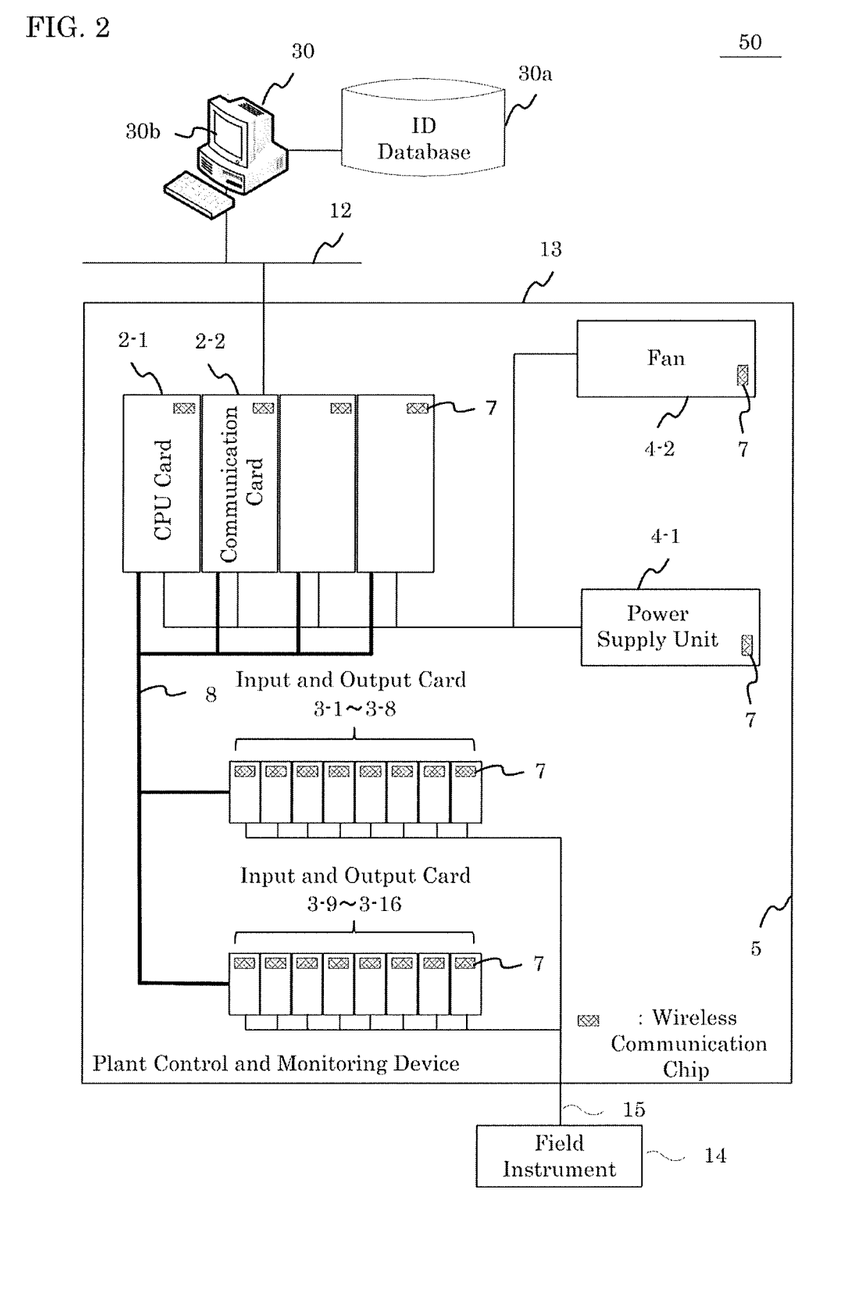
FIG. 2 is a drawing for showing the component parts of the plant control and monitoring device, in accordance with Embodiment 1 of the present invention.

Next, with reference to FIG. 2, explanations will be made for the configuration of the plant control and monitoring device, in accordance with Embodiment 1 of the present invention. A system which is constituted with a plant control and monitoring device 13, a maintenance tool 30, a control network 12, field instruments 14A-14D, and others, is referred to as a hardware management system 50. The plant control and monitoring device 13 consists of a CPU card 2-1, a communication card 2-2, input and output cards 3-1 to 3-16, a power supply unit 4-1, a fan 4-2, and others. These component parts are mounted in a control panel 5 (a case), and replacement of these component parts is allowed. The input and output cards 3-1 to 3-16 are connected with the field instruments 14A-14D by the dedicated line 15. The plant control and monitoring device 13 reads out process data which are transmitted from field instruments, by the use of the input and output cards 3-1 to 3-16.

The input and output cards 3-1 to 3-16 are in the same configuration and it is hard to distinguish those cards from their appearances. For example, the input and output card 3-6, the input and output card 3-7, and the input and output card 3-8 are, respectively, a thermoelectric couple input card, a voltage input card, and a current input card. Component parts (a CPU card 2-1, a communication card 2-2, input and output cards 3-1 to 3-16, a power supply unit 4-1, a fan 4-2, and the like) of the plant control and monitoring device 13 are respectively attached with a wireless communication chip 7. The maintenance tool 30 monitors the state of the plant control and monitoring device 13, and, in addition, performs the creation and download of a software.

The maintenance tool 30 is connected to the communication card 2-2 of the plant control and monitoring device 13 by the control network 12. The component parts (a CPU card 2-1, a communication card 2-2, input and output cards 3-1 to 3-16, a power supply unit 4-1, a fan 4-2 and the like) of the plant control and monitoring device 13 are respectively given a unique ID (Identification) for the purpose of discriminating a component part from other component parts. The unique ID is recorded on a wireless communication chip 7 which has a function of wireless communications. The wireless communication chip 7 can be stuck on the component part. The communication card 2-2 has a reader function designed to read out information from a wireless communication chip 7, which is provided with each of the component parts. The CPU card 2-1, the communication card 2-2, and the input and output cards 3-1 to 3-16 are connected to a system bath 8 of the plant control and monitoring device 13. The CPU card 2-1 is in charge of controlling the input and output cards 3-1 to 3-16. An IC tag of RFID (Radio Frequency Identification) and the like, for example, can be used as a wireless communication chip 7.

Next, explanations will be made for the operation of the plant control and monitoring system 100. The communication card 2-2 is in charge of reading out periodically (in a cycle of control operation) a unique ID from the wireless communication chip 7 of the component part. The communication card 2-2 can also read out a unique ID from a component part, by issuing a response requirement, if need arises. When a response requirement is issued, a component part will transmit a unique ID from the wireless communication chip 7. The communication card 2-2 is in charge of transmitting the read out unique ID of the component part to the maintenance tool 30 through the control network 12. The maintenance tool 30 is in charge of recording, in the ID database 30a, unique IDs of the component parts which constitute the plant control and monitoring device 13.

The maintenance tool 30 has a function designed to make collation between the ID database 30a and the unique ID of a component part, which is received from the communication card 2-2 of the plant control and monitoring device 13. When a difference is found between the recorded contents of the ID database 30a and the unique ID of the component part which is received from the communication card 2-2 of the plant control and monitoring device 13, the maintenance tool 30 will report a warning to the monitor display 30b. In this way, the maintenance tool 30 can check, through the collation, whether or not there is a replacement of a component part which is not recorded.

Figure 3:
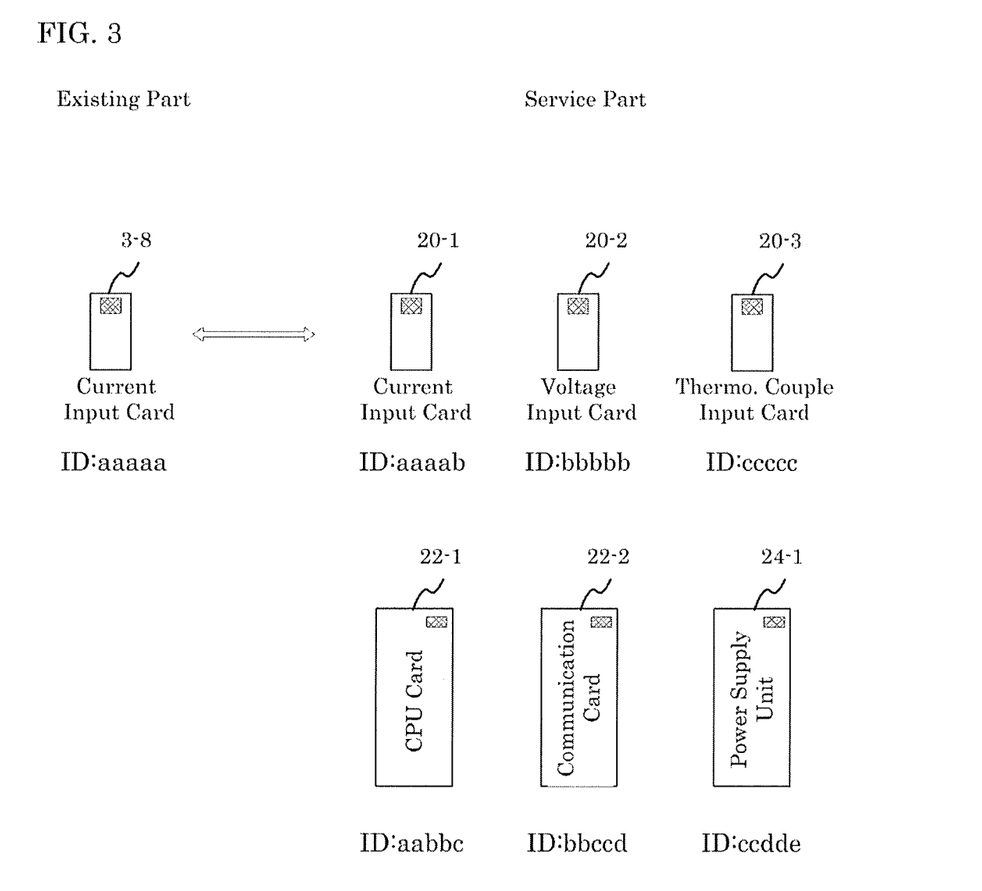
FIG. 3 is a drawing for showing the relationship between service parts and an existing part, in accordance with Embodiment 1 of the present invention.

FIG. 3 illustrates the relation of an existing part and service parts in accordance with Embodiment 1 of the present invention. Here, an input and output card 3-8 is a current input card, and it is assumed that the card has "aaaaa" as a unique ID. A service part 20-1 is a current input card which is of the same model number with the input and output card 3-8, and has "aaaab" as a unique ID. A service part 20-2 is a voltage input card which is of the same model number with the input and output card 3-7, and has "bbbbb" as a unique ID. A service part 20-3 is a thermoelectric couple input card which is of the same model number with the input and output card 3-6, and has "ccccc" as a unique ID. A service part 22-1 is a CPU card which is of the same model number with the CPU card 2-1, and has "aabbc" as a unique ID. A service part 22-2 is a communication card which is of the same model number with the communication card 2-2, and has "bbccd" as a unique ID. A service part 24-1 is a power supply unit which is of the same model number with the power supply unit 4-1, and has "ccdde" as a unique ID.

When the input and output card 3-8 is in need of replacement with the service part 20-1 due to the breakdown or the like, a modification is made to the ID database 30a which has been recorded beforehand in the maintenance tool 30. By recording beforehand in the ID database 30a a unique ID of the component part which is to be replaced with, a maintenance record can be created and reserved. When the input and output card 3-8 is replaced with the service part 20-2, the identity of the component part slips out of the memory from the production time. The maintenance tool 30 can distinguish a card from another card, even if the both cards are in the same configuration, because those unique IDs are different from each other.

In the case where exchange of component parts is carried out without changing their unique IDs which are recorded in the maintenance tool 30, a warning will be reported on a screen of the maintenance tool 30m, because a unique ID which is in the ID database 30a of the maintenance tool 30 is different from a unique ID which is to be received from the communication card 2-2. In this way, even when component parts are exchanged in an unintended manner, the exchange of the component parts can be detected in real time. Therefore, mistakes at the time of part exchanging in regular works can be prevented, and besides that, a dishonest reconstruction which aims at the malfunction of a plant control and monitoring device can be prevented. In a consequence, a plant control and monitoring system and a plant control and monitoring device which are capable of providing high level of security can be established.

It is to be noted that, descriptions in Embodiment 1 are made for the case where the exchange of component parts is detected by the identification management of unique IDs, and further, the efficiency in the maintenance can be promoted by using a unique ID of the present invention. The maintenance tool 30 stores information as a database, by correlating the information with the unique IDs of component parts, where the stored information includes a year of manufacture, a recommended time for replacement, a maintenance record, a service history, and so on. When a component part fails to operate properly, the maintenance tool 30 will provide a maintenance member with these pieces of information on the basis of the unique ID, and therefore, it is possible for the maintenance member to create a work plan efficiently.

Therefore, a plant control and monitoring device in accordance with the present application includes; a component part having a unique ID which is unique to the part in order to carry out the identification management of the component part, a communication card having a reader function for reading out the unique ID from a wireless communication chip, a communication network for transmitting a read out unique ID to a maintenance tool, and a maintenance tool, recording the component parts of a control device (a plant control and monitoring device) in a ID database, and collating a unique ID which is received from the control device with the ID database. Furthermore, the plant control and monitoring device in accordance with the present application performs the correlation of a unique ID which is given to a component part, and is capable of carrying out, by the maintenance tool, collective management of the maintenance information, which includes a year of manufacture, a recommended time for replacement, a service history, and the like of a component p art.

In other words, a plant control and monitoring system, in connection with the present invention, includes; a maintenance tool, having an ID database which correlates a unique ID with a component part that possess the unique ID, and holds a relation between the unique ID and the component part in memory and a plant control and monitoring device connected with a maintenance tool through a control network, wherein the plant control and monitoring device owns a communication card which possesses a first wireless communication chip on which a first unique ID is recorded, a CPU card which possesses a second wireless communication chip on which a second unique ID is recorded, an input card which possesses a third wireless communication chip on which a third unique ID is recorded, and a power supply unit which possesses a fourth wireless communication chip on which a unique ID is recorded, and wherein the first wireless communication chip that is possessed by the communication card reads out a unique ID from the second wireless communication chip or the fourth wireless communication chip, and transmits the read out unique ID to the maintenance tool through the control network, and when the maintenance tool receives a unique ID which is transmitted through the control network, the maintenance tool collates the received unique ID with the ID database.

Embodiment 2

Figure 4:
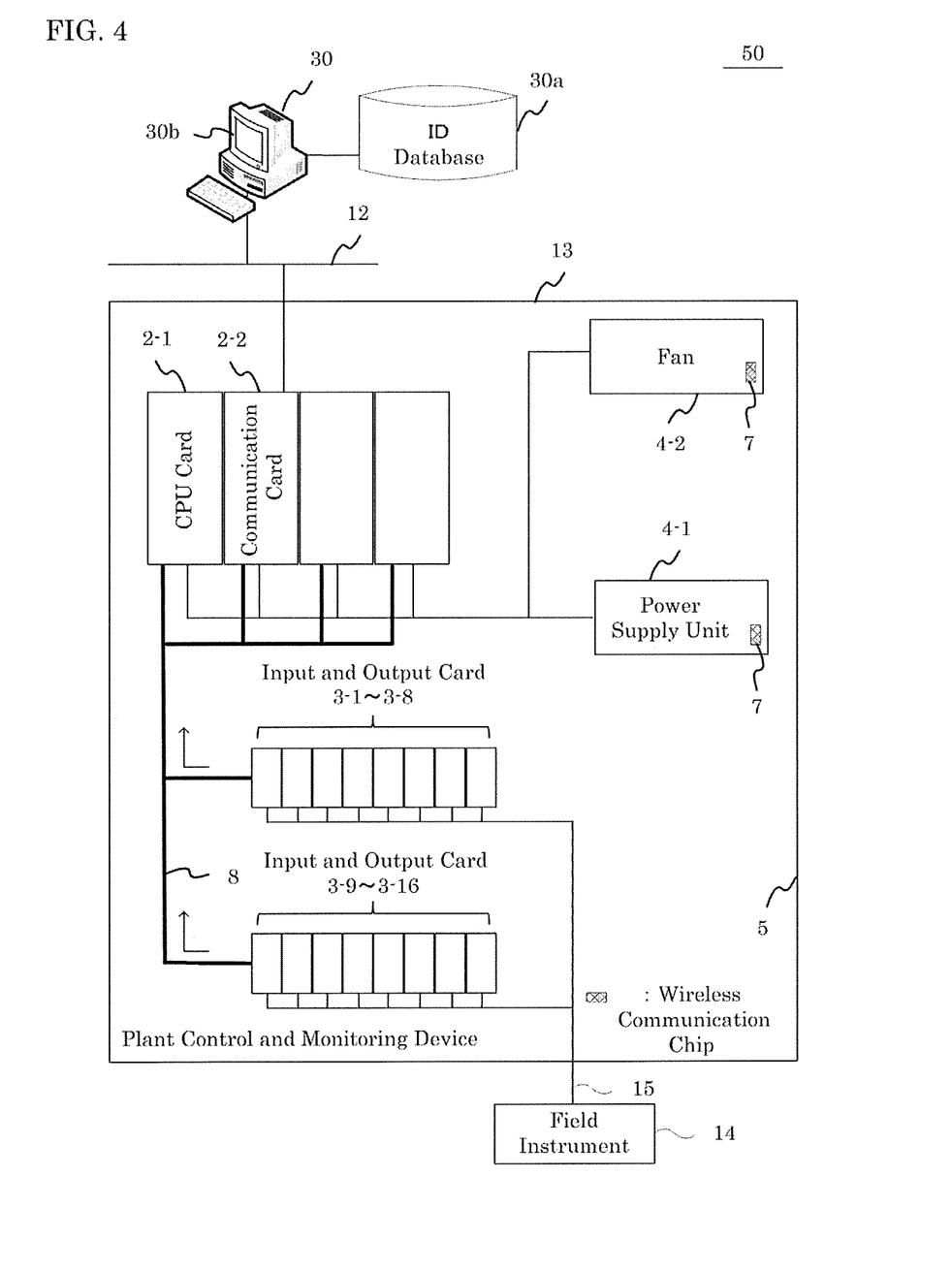
FIG. 4 is a drawing for showing the component parts of a control and monitoring device, in accordance with Embodiment 2 of the present invention.

Explanations will be made for the configuration of a plant control and monitoring system in accordance with Embodiment 2 of the present invention. In reference to FIG. 4, the plant control and monitoring system 100 in accordance with the present embodiment consists of a plant control and monitoring device 13, a maintenance tool 30, and others. In Embodiment 1, a component part of the plant control and monitoring device 13 is given a chip which has a wireless communication function, and the communication card 2-2 is in charge of reading out a unique ID from the component part through wireless communications. As is shown in the drawing, the plant control and monitoring system in accordance with the present embodiment uses a system bath 8 of the plant control and monitoring device 13, and reads out unique IDs of the CPU card 2-1 and the input and output cards 3-1 to 3-16. In the case described above, it is not necessary to provide a component part with a chip which has wireless communication function, and then, the reduction in cost can be attained.

Figure 5:
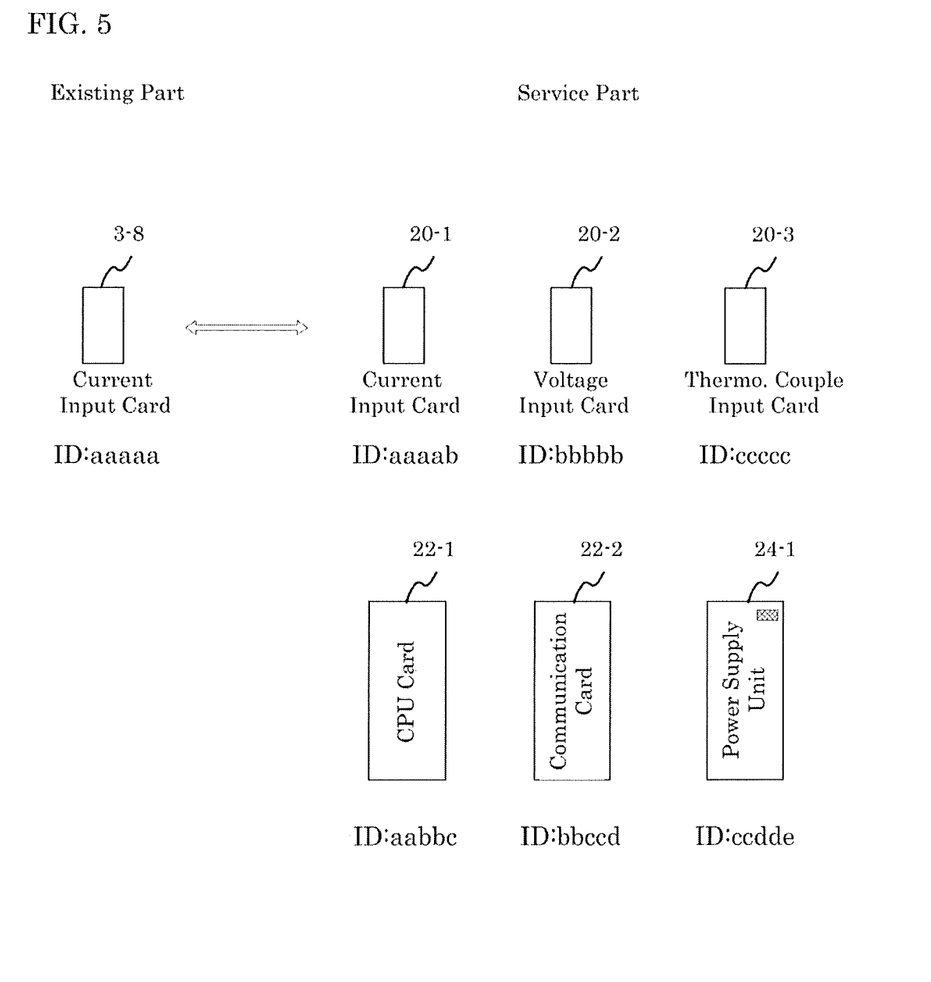
FIG. 5 is a drawing for showing the relationship between service parts and an existing part, in accordance with Embodiment 2 of the present invention.

FIG. 5 illustrates the relation of an existing part and service parts in accordance with Embodiment 2 of the present invention. An input and output card 3-8 is a current input card, and it is assumed that the card has "aaaaa" as a unique ID. A service part 20-1 is a current input card which is of the same model number with the input and output card 3-8, and has "aaaab" as a unique ID. A service part 20-2 is a voltage input card which is of the same model number with the input and output card 3-7, and has "bbbbb" as a unique ID. A service part 20-3 is a thermoelectric couple input card which is of the same model number with the input and output card 3-6, and has "ccccc" as a unique ID. A service part 22-1 is a CPU card which is of the same model number with the CPU card 2-1, and has "aabbc" as a unique ID. A service part 22-2 is a communication card which is of the same model number with the communication card 2-2, and has "bbccd" as a unique ID. A service part 24-1 is a power supply unit which is of the same model number with the power supply unit 4-1, and has "ccdde" as a unique ID. Unique IDs of the input and output cards 3-1 to 3-16, the CPU card 2-1, and the communication card 2-2 can be rewritten, with the use of a dedicated device.

Figure 6:
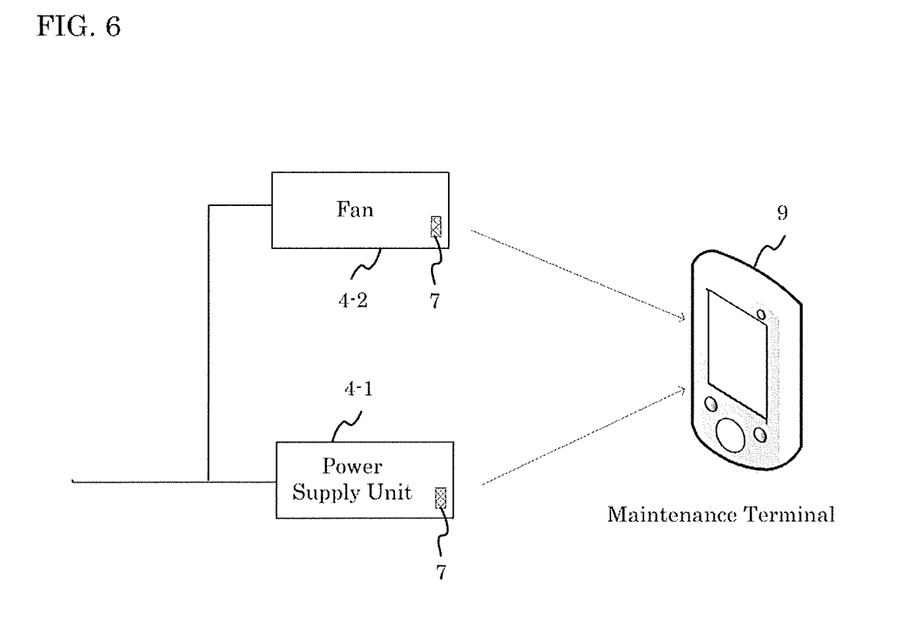
FIG. 6 is a drawing for showing a maintenance terminal, a power supply unit, and a fan, in accordance with Embodiment 2 of the present invention.

It is to be noted that as to the component parts including a power supply unit 4-1, a fan 4-2 and the like, their unique IDs cannot be read out with the communication card 2-2, because those component parts will not be connected to the system bath 8 of the plant control and monitoring device 13. Therefore, as to the power supply unit 4-1, the fan 4-2 and the like, wireless communication chips 7 are attached to them. FIG. 6 illustrates the relation among a maintenance terminal 9, a power supply unit 4-1, and a fan 4-2. As for the component parts which are not connected to the system bath 8, the identification of their unique IDs is performed on a job spot using the maintenance terminal 9.

Therefore, a plant control and monitoring device in accordance with the present application includes; a component part having a ID which is unique to the component part in order to carry out the identification management of the component part, a communication card having a function for reading out the unique ID through a control system bath, a communication network for transmitting the read out unique ID to a maintenance tool, and a maintenance tool, recording component parts of a control device (a plant control and monitoring device) in a ID database, and performing collation between a unique ID which is received from the control device and the ID database.

In other words, a plant control and monitoring system, in connection with the present invention, includes; a maintenance tool, having an ID database which correlates a unique ID with a component part that possess the unique ID, and holds a relation between the unique ID and the component part in memory and a maintenance tool having an ID database which keeps in memory a correlation between a unique ID and a component part which possess the unique ID, and a plant control and monitoring device connected with a maintenance tool through a control network, wherein the plant control and monitoring device owns a communication card which possesses a first unique ID, a CPU card which possesses a second unique ID, an input card which possesses a third unique ID, and a system bath making connection among the communication card, the CPU card and the input card, and wherein the communication card reads out a second unique ID and a third unique ID from the CPU card and the input card by way of the system bath, and transmits the read out unique ID to the maintenance tool through the control network, and when the maintenance tool receives a unique ID which is transmitted through the control network, the maintenance tool collates the received unique ID with the ID database.

Note that, in the present invention, each of the embodiments can be freely combined, appropriately modified and/or eliminated without departing from the scope of the invention.

EXPLANATION OF NUMERALS AND SYMBOLS

2-1 CPU Card, 2-2 Communication Card, 3-1 to 3-16 Input and Output Card, 4-1 Power Supply Unit, 4-2 Fan, 5 Control Panel, 7 Wireless Communication Chip, 8 System Bath, 9 Maintenance Terminal, 11 Operator Station, 12 Control Network, 13 Plant Control and Monitoring Device, 14 Field Instrument, 14A-14D Field Instrument, 15 Dedicated Line, 20 Service Part, 30 Maintenance Tool, 30 a ID Database, 30 b Monitor Display, 50 Hardware Management System, 100 Plant Control and Monitoring System

What is claimed is:

1. A plant control and monitoring system, comprising:
   a maintenance tool, having an ID database which is configured to correlate a unique ID with a component part that possess the unique ID, and store a relation between the unique ID and the component part in memory and
   a plant control and monitoring device connected with the maintenance tool through a control network,
   wherein the plant control and monitoring device comprises:
      a communication card directly coupled to a first wireless communication chip on which a first unique ID associated with the communication card is recorded,
      a CPU card directly coupled to a second wireless communication chip on which a second unique ID associated with the CPU card is recorded,
      an input card directly coupled to a third wireless communication chip on which a third unique ID associated with the input card is recorded, and
      a power supply unit directly coupled to a fourth wireless communication chip on which a fourth unique ID associated with the power supply unit is recorded,
      wherein the first wireless communication chip, the second wireless communication chip, the third wireless communication chip, and the fourth wireless communication chip are distinct from one another and different from the communication card and the CPU card, and wherein the first wireless communication chip that is coupled to the communication card is configured to:
read out unique IDs from the second wireless communication chip to the fourth wireless communication chip, and
transmit the read out unique IDs to the maintenance tool through the control network, and wherein the maintenance tool is configured to:
receive the unique IDs which are transmitted through the control network, and
in response to receiving the received unique IDs, collate the received unique IDs with the ID database.

2. The plant control and monitoring system according to claim 1,
wherein a recommended time for replacement of a component part is recorded in the ID database, where a unique ID of the component part is correlated with the time for replacement.

3. The plant control and monitoring system according to claim 1,
wherein the maintenance tool is configured to judge whether there is an injustice, and in the case that the maintenance tool judges that there is an injustice, report a warning on a monitor display after collating the received read out unique IDs with the ID database.

4. A plant control and monitoring system, comprising:
a maintenance tool, having an ID database which is configured to correlate a unique ID with a component part that possess the unique ID, and store a relation between the unique ID and the component part in memory, and
a plant control and monitoring device connected with the maintenance tool through a control network,
wherein the plant control and monitoring device comprises:
a communication card which possesses a first unique ID associated with the communication card,
a CPU card which possesses a second unique ID associated with the CPU card,
an input card which possesses a third unique ID associated with the input card, and
a system bath making connection among the communication card, the CPU card and the input card, and
wherein the communication card is configured to:
read out, using the system bath, the second unique ID and the third unique ID from the CPU card and the input card, and
transmit the read out unique IDs to the maintenance tool through the control network, and wherein the maintenance tool is configured to:
receive the read out unique IDs which are transmitted through the control network, and
in response to receiving the received read out unique IDs, collate the received read out unique IDs with the ID database.

5. The plant control and monitoring system according to claim 4,
further comprising a power supply unit directly coupled to a first wireless communication chip on which a fourth unique ID associated with the power supply unit is recorded, and
a maintenance terminal for performing the identification of the fourth unique ID.

6. The plant control and monitoring system according to claim 4,
wherein a recommended time for replacement of a component part is recorded in the ID database, where a unique ID of the component part is correlated with the time for replacement.

7. The plant control and monitoring system according to claim 2,
wherein in the case that the maintenance tool judges that there is an injustice, after collating the received read out unique IDs with the ID database, the maintenance tool reports a warning on a monitor display.

8. A plant control and monitoring system, comprising:
a maintenance tool having an ID database which is configured to correlate a unique ID with information on a component part that is correlated with the unique ID, and store the unique ID and the information in memory, and
a plant control and monitoring device, connected with the maintenance tool through a control network,
wherein the plant control and monitoring device comprises:
a component part directly coupled to an IC tag on which the unique ID associated with the component part is recorded, and
a communication device which is configured to:
read out a unique ID from the IC tag, and
transmit the read out unique ID to the maintenance tool by way of the control network, and,
wherein the maintenance tool is configured to:
receive the read out unique ID, which has been transmitted through the control network,
in response to receiving the received read out unique ID, collate the received read out unique ID with the ID database, and
display an outcome of the collation.

* * * * *